United States Patent Office 3,208,909
Patented Sept. 28, 1965

3,208,909
ANAEROBIC PROCESS FOR PRODUCTION OF A GEL-ADSORBED ANTHRAX IMMUNIZING ANTIGEN
Milton Puziss and George G. Wright, Frederick, Md., assignors to the United States of America as represented by the Secretary of the Army
No Drawing. Filed May 19, 1961, Ser. No. 115,835
3 Claims. (Cl. 167—78)
(Granted under Title 35, U.S. Code (1952), sec. 266)

The invention described herein may be manufactured and used by or for the Government of the United States of America for governmental purposes without the payment to us of any royalty thereon.

This invention relates to a method for producing an anthrax immunizing antigen under anaerobic culture conditions in a non-protein, chemically defined medium and for filtering, adsorbing and concentrating the antigen elaborated in the culture filtrate with a pre-formed aluminum hydroxide gel. The resulting product is preserved and stabilized for long term storage by the addition of a small amount of Formaldehyde Solution, U.S.P. (XVI, 1960) and Benzethonium Chloride Solution, U.S.P. (XVI, 1960). The final product is free of contaminating viruses and foreign protein material derived from the medium which might infect or prove injurious to man. Moreover, no toxic factors are produced by the organism under these conditions of growth which could be incorporated into the final product. The result is a non-viable immunizing antigen that can safely be administered to both animals and man and which gives a high degree of protection against infection by Bacillus anthracis.

*Preparation of medium*

The medium which is prepared under sterile conditions consists generally of a mixture of amino acids, inorganic salts, accessory growth factors, and glucose together with a bicarbonate salt, ferrous sulfate and pyridoxal hydrochloride.

More specifically, a preferred medium is prepared. The following chemicals designated as AB stock are weighed out on an analytical balance, placed in a 1 liter Erlenmeyer flask and dissolved in 380 ml. distilled water. All chemicals are reagent or C.P. grade.

| Chemical name: | Grams/400 ml. stock |
| --- | --- |
| Biotin, crystalline | 0.005 |
| Thiamine hydrochloride | 0.004 |
| Adenosine | 0.010 |
| l-Alanine | 0.09 |
| l-Tryptophane | 0.104 |
| dl-Serine | 0.208 |
| l-Arginine hydrochloride | 0.208 |
| l-Proline | 0.292 |
| Glycine | 0.292 |
| dl-Methionine | 0.300 |
| dl-Threonine (allo-free) | 0.600 |
| dl-Valine | 0.600 |
| dl-Aspartic acid | 0.640 |
| dl-Isoleucine | 0.640 |
| dl-Phenylalanine | 0.680 |
| l-Histidine hydrochloride | 0.960 |
| dl-Leucine | 1.280 |
| l-Glutamic acid | 1.680 |
| Manganous sulfate (monohydrate) | 0.04 |
| Magnesium sulfate (septahydrate) | 0.10 |
| Calcium chloride (dihydrate) | 0.148 |
| Glucose | 10.0 |

The following chemicals known as—C stock—are weighed out and heated to solution in 400 ml. water:

| | Gm. |
| --- | --- |
| Potassium phosphate (monobasic) | 6.8 |
| Potassium phosphate (dibasic) | 8.7 |

Following this, 0.092 gm. guanine hydrochloride is dissolved in 20 ml. distilled water to which is added 0.3 ml. concentrated hydrochloric acid and boiled to effect solution. This is added to the 380 ml. AB solution and the resulting 400 ml. heated to 50–60° C. and shaken to dissolve all components.

Then, 25.0 gm. sodium bicarbonate is dissolved in 200 ml. distilled water and autoclaved separately from the main lot of medium. Next, 0.016 gm. ferrous sulfate is made up to volume with 100 ml. distilled water plus 0.15 ml. concentrated hydrochloric acid. This is heated to dissolve, and the solution passed through a sterile sintered-glass filter (Corning, ultra fine porosity) for final sterilization.

Finally, 0.10 gm. pyridoxal hydrochloride is dissolved in 20 ml. distilled water and similarly sterilized by passing through an ultra-fine sintered glass filter.

The final medium is prepared as follows, in a 12 liter aspirator bottle containing a Teflon-covered magnetic stirring bar:

| | Ml. |
| --- | --- |
| Distilled or de-ionized water | 8,780 |
| AB stock | 400 |
| C stock | 400 |

The aspirator bottle is suitably stoppered, the components mixed by stirring with a magnetic stirring motor, and the medium autoclaved for 30–35 minutes at 15 p.s.i. The medium is then removed from the autoclave and cooled rapidly to room temperature.

After cooling the medium is completed by adding the remaining components in the following order, using aseptic techniques throughout.

200 ml. sterile sodium bicarbonate stock solution.
100 ml. sterile ferrous sulfate stock solution.
20 ml. sterile pyridoxal hydrochloride solution.

To this completed medium is then added 100 ml. of a standard spore suspension of Bacillus anthracis, adjusted so that the final spore concentration is 500 spores per ml. of medium. The pH of the medium after autoclaving is 6.4–6.5, and after all additions have been made the completed medium should have a pH of 7.6 to 7.8. Addition of the ferrous sulfate solution causes the development in the medium of a slightly opalescent green tinge. The culture vessel is flushed with tank nitrogen through a sterile gassing apparatus for about 10 minutes and then sealed off, thereby retaining an atmosphere of nitrogen above the surface of the medium. The jar of medium is placed in a 37° C. incubator.

After 18 hours of incubation, growth becomes visible in the form of a fibrous mat on the flask bottom. A magnetic stirring motor is placed beneath the medium and adjusted so that the contained stirring bar rotates at a slow rate, just sufficient to keep the medium turbid with suspended growth and without causing any excessive vortex formation or foaming at the fluid surface.

Cultures are harvested after 40–43 hours' incubation at which time growth will be in the form of a very turbid suspension of fine granular particles. After removing the culture from the incubator, gas pressure developed during incubation is released. The pH of the medium will have dropped to about 6.9–7.0 and a characteristic odor of fermentation acids will be evident. The culture is adjusted to a pH of 8.0–8.1 with normal sodium hydroxide. A pink color, which is of unknown significance, may appear after the addition of the alkali.

*Production of antigen*

The culture is next filtered for removal of the organisms, using either a Selas #03 porosity or Corning ultra fine sintered glass type filter. In the example, four Corning filter candles (ultra fine porosity, 1" x 10 3/16") inclosed in glass mantles were fitted into Buchner vacuum receiver flasks and the assemblies sterilized by autoclaving. The culture is allowed to flow by gravity into the inclosed filters and vacuum is applied to the receiver flasks. After completion of the filtering, the filtrate flasks are stoppered with sterile cotton plugs. At this point, a sterility test is made of the filtrate by placing a representative sample on nutrient agar Petri plates and incubating at 37° C. for 24 hours. All filtrates showing evidence of contamination or growth are regarded as contaminated and are destroyed. The container of filtrate is placed atop a magnetic stirring motor and 1/35 the filtrate volume of a sterile 56% solution of preformed aluminum hydroxide gel is added to each receiver flask. This gel is specially prepared for parenteral use and the stock aluminum hydroxide cream which is diluted to make the 56% solution (or 1.12% of the 2% stock suspension) consists entirely of a 2% suspension of aluminum oxide containing 10 mg./ml. of aluminum. Concentration of the aluminum hydroxide gel in the final product is 14.9 mg. per 0.5 ml. dose, expressed as alum equivalents in accordance with standards set forth by the Division of Biologic Standards of the National Institutes of Health.

The aluminum hydroxide gel employed in the present invention corresponds to the prior art preparation developed by A. Hansen as described in WHO Techn. Report Series, vol 61, pages 64 and 65 (1953).

The gel solution, when added to the culture filtrate, forms large floccules which are gradually dispersed by the stirring action into a dense turbid suspension. The pH is adjusted to 8.0 to 8.1 and the stoppered flasks placed in the cold (4° C.) for settling of the adsorbed antigen. The settling is continued for 7 days during which time the solution is agitated once or twice each day to resuspend the settled solids.

Alternatively, by means of the sterile magnetic stirring bar in the receiver flasks, continual slow agitation with a stirring motor will shorten the adsorbtion time to 2 days instead of 7 days. The material is then allowed to settle for 4 hours or until the supernatant layer is clear.

After the settling period is complete the supernatant liquid is removed by vacuum aspiration and destroyed. The remaining gel suspension is centrifuged mildly at 1800 r.p.m. for 5 minutes (equivalent to 750× G) and clear supernatants are again removed and destroyed. The remaining gel is made fluid by the addition of 950 ml. of sterile cold physiological saline. Twenty-five ml. of Benzethionium Chloride Solution, U.S.P. (XVI, 1960), are added aseptically from a glass-filtered, sterile solution (1/1000) to give a 1 to 40,000 final concentration. Twenty-five ml. of Formaldehyde Solution, U.S.P. (XVI, 1960), are also added from a filtered, sterile solution (1–100 dilution) to give a final concentration of 0.009%. Volume of the final product is 1,000 ml. The gel adsorption effects a 10-fold concentration of the antigen from the original culture filtrate.

If the antigen is to be bottled, this is performed in a special hood under ultra violet sterilizing lamps. The antigen may also be stored in bulk at 4° C. Final yield from 10 liters of starting medium is 1,000 ml., which will contain 2000 individual doses of 0.5 ml. each.

*Safety tests on the antigen*

One ml. samples of the final antigen are inoculated into each of 4 Difco tryptose broth tubes (10 ml./tube) and one ml. is also inoculated into each of 4 Difco thioglycollate broth tubes (20 ml./tube). In addition, one ml. is inoculated into a flask (100 ml.) of tryptose broth and also into a flask (100 ml.) of thioglycollate broth. After 48 hours incubation at 30° C. subcultures are made from all the above media into dublicate tubes of media. All materials are incubated for 7 days at 30° C. with daily observations made for evidence of bacterial growth as an indicator of contamination.

Other safety and sterility tests are performed as required by the Division of Biologics Standards of the National Institutes of Health.

Safety tests on animals were performed by inoculating 10 white mice (18–25 gm.) intraperitoneally with ½ ml. antigen and 5 normal guinea pigs (200–350 gm.) intraperitoneally with 5 ml. antigen, undiluted. The animals were observed daily for 21 days and all animals dying during this period were posted and examined for evidence of infection by *Bacillus anthracis*. Samples for this testing were selected at random, following the principles set forth by the Division of Biologic Standards of the National Institutes of Health.

*Potency tests on the antigen*

The immunizing potency assay of the antigen is performed in rabbits. A dilution of one part antigen and 9 parts sterile physiological saline is prepared; one-half ml. of this 1–10 dilution of antigen is injected subcutaneously into the shaven flanks of 8 normal, healthy rabbits (4–6 lbs.). Two weeks later, the immunized rabbits and 2 normal unimmunized control animals are challenged by intracutaneous injection, on the shaven opposite flank, with a standard challenge dose of 10,000 spores in sterile distilled water, of the virulent Vollum strain of *Bacillus anthracis* contained in 0.25 ml., which is equivalent to approximately 200 $LD_{50}$. The animals are held for 14 days and the number and day of death recorded. All animals dying during this period are posted and examined for evidence of infection by *Bacillus anthracis*.

Unimmunized control animals usually die between the 2nd and 4th day, and invariably by the 6th day post challenge. The product is considered of satisfactory antigenic potency if at least 75% of the immunized animals survive the 14 day post-challenge observation period. Lesions at the challenge site in immunized animals are minimal. Survival by 75–100% of the test animals has been consistently obtained after immunization with a single 0.5 ml. injection of the antigen diluted 1 to 10. Guinea pigs (250–350 gm.) can also be successfully immunized. A single injection of 0.25 ml. of the antigen diluted 1 to 2, given subcutaneously, will protect 80–95% of test animals against a challenge dose of 200 $LD_{50}$ of virulent *Bacillus anthracis* spores.

Stability of the antigen to an accelerated aging test resulted in 83% of the test animals surviving challenge after immunization with antigen which had been heated for 26 days at 37° C. A survival ratio of 50% was obtained after test animals had been immunized with antigen heated at 37° C. for a 41 day period. A test lot of the antigen showed no loss in immunizing potency after storage for one year at 4° C. Shelf life of the antigen can be conservatively estimated as from two to three years at refrigerator temperature.

A controlled study of the effectiveness of the antigen to immunize humans was undertaken by the Medical Investigation Division at Fort Detrick, Maryland. A total of 72 human volunteer subjects were immunized with the antigen and they were subsequently carefully examined in follow-up studies for any evidence of unusual or untoward clinical reactions to the antigen.

No systemic reactions such as fever, headache, nausea, or anorexia were observed in any of the subjects. About 4% of the subjects exhibited mild local reactions at the site of the injection. These were primarily small localized areas of erythema and edema sometimes accompanied by slight itching. The reactions were mild and of a transitory nature, disappearing within 48 hours.

The reaction tended to decrease after subsequent injections of the antigen in the three-injection initial immunization phase. Booster injections were given the volunteers six months later and either did not elicit any reactions or only mild reactions in those subjects that had previously shown a reaction during the initial immunization phase. These studies have shown unequivocally that the antigen is completely safe and is clinically acceptable for use in human immunization against anthrax.

Studies were also made on the development of anti-anthrax antibody in the serum of the volunteer subjects immunized with the antigen. After the initial immunization series, 59% of the volunteers had serum antibody titers of 1–8 or higher. After the booster injection, 68% of the subjects had serum antibody titers of 1–8 or higher.

These studies show accordingly that the antigen is compatible with humans and is capable of developing a satisfactory level of immunity, as indicated by serum antibody titers.

It is to be understood that the specific medium used is one of preference only and that large variants are possible. Likewise variants are possible in the culturing, adsorption and stabilizing of the antigen.

In considering the several alternatives available in medium composition it is to be noted that two factors generally are required namely, organism growth and antigen elaboration into the medium. In addition, the rate of growth and therefore the time required for preparing and harvesting a batch of antigen becomes of importance. Growth is estimated by visual or other methods of observation of turbidity, and the elaboration of antigen is tested by assay of the lyophilized filtrate in guinea pigs by a standard in vivo assay. In addition, complement fixation titration is used as a standard in vitro assay to determine antigenic potency of culture filtrates. A pilot plant proving study has shown that the method as described herein is applicable for large scale production. Satisfactory potency was obtained in test lots of 300 liter volumes.

It has been determined that sodium bicarbonate, calcium ion, leucine, isoleucine, proline, phenylalanine, methionine and histidine were essential factors in antigen production. Essential also was a readily utilizable carbohydrate, such as glucose or sucrose. Similarly, magnesium ion was essential to growth and elements such as purines and vitamins were useful in stimulating and promoting growth.

The presence of bicarbonate ion was shown to be necessary for the production of antigen and although the organism grew at a normal rate when bicarbonate was omitted, or when the bicarbonate-free medium was aerated with carbon dioxide-free air, no detectable antigen was elaborated. When bicarbonate was omitted, the cultures became more acid than did control cultures during growth. When such cultures grown in bicarbonate-free medium were maintained at the same pH as the bicarbonate-containing control by periodic additions of sterile NaOH there was still no protective antigen in the cultures, or only traces of antigen were detected. Correspondingly, reduction of bicarbonate concentration produced a decrease in antigen elaboration. Similarly, attempts to replace bicarbonate with compounds such as citrate, succinate, fumarate or maleate which are known to be involved in carbon dioxide metabolism resulted in no significant stimulation of antigen elaboration. Moreover, the addition of sodium citrate to a bicarbonate containing medium caused a marked inhibition of antigen elaboration, perhaps because of complex formation of metal ions in the medium. Thus, the need for bicarbonate ion for antigen elaboration appears to be conclusive.

It is significant also that the concentration of bicarbonate ion necessary for elaboration of antigen is relatively high as compared with other components of the medium. It is of interest that isoleucine and phenylalanine are also necessary for production of capsular polypeptide by *Bacillus anthracis*. Omission of glutamic acid delays but does not reduce the accumulation of polypeptide and antigen.

Purines or their derivatives would not appear to be directly associated with elaboration of antigen, but rather to affect the process through stimulation of growth of the organism. Thus elaboration of antigen was detected in the absence of purines if the incubation time was lengthened until good growth was obtained and the ability of the various purine compounds to enhance production of antigen was apparently correlated with their ability to stimulate growth. Threonine and glutamic acid were apparently in a similar category.

Omission of calcium chloride from the medium did not affect growth significantly, but caused a marked reduction in elaboration of protective antigen. Omission of magnesium sulfate resulted in almost complete inhibition of growth. Doubling the concentrations of calcium and magnesium salts did not increase the elaboration of antigen.

The organisms used as production strains were obtained from certain wild-type strains isolated during natural outbreaks of anthrax. Thus the three most satisfactory production strains used were secured from three of the parent strains isolated in various outbreaks in the United States. The wild-type strains were subjected to mutation by exposure to ultra violet radiation, after which the organisms were plated out and colonies selected that were rough, non-encapsulated, non-proteolytic and avirulent on animal inoculation. These strains were grown in the preferred medium for a period of 40 to 45 hours at 37° C. The 45 hour maximum proved to be the time after which degradation of the accumulated antigen began to set in. Prolonged incubation causes large antigen loss in the cultures. Samples of these three strains have been deposited with the ATCC. These have been given the designations ATCC 14185, 14186 and 14187.

The preferred elements of the process may be enumerated as follows:

(1) The growth of the culture is performed under anaerobic conditions in a chemically-defined, non-protein medium. This method maintains the culture free of contamination and harmful foreign protein or other noxious substances and results in elaboration of a high-potency immunizing antigen free from toxic material or contaminating viruses.

(2) Adsorption of the antigen onto a pre-formed aluminum hydroxide gel under specific conditions. This results in concentration of the antigenic material and an increase in potency owing to the adjuvent effect of the aluminum hydroxide gel.

(3) Addition of Benzethonium Chloride Solution (XVI, 1960) and Formaldehyde Solution (XVI, 1960). These materials give a preservative and a stabilizing effect, respectively, to the final product so that freedom from contamination and a high level of antigenic potency are maintained for extended periods of time. It is to be noted that the amount of formaldehyde solution added is far below that necessary to destroy or inactivate organisms, hence the filtrate or concentrate has to be sterile prior to the above additions.

We claim:

1. A method of preparing a nonviable anthrax immunizing antigen suitable for use in human immunization which comprises preparing a non-protein, chemically defined medium comprising a readily utilizable carbohydrate, amino acids and magnesium, calcium, ferrous and manganous inorganic salts, sterilizing the medium by autoclaving, adding sterile sodium bicarbonate solution to the sterilized medium, inoculating said medium with a selected spore suspension of *Bacillus anthracis*, culturing under anaerobic conditions at about 37° C. until the growth forms a turbid suspension, adjusting the pH of the medium to about 8.0 to 8.1, filtering out the organisms, adding to the filtrate a sterile solution of preformed aluminum hydroxide gel, readjusting the pH to about 8.0 to 8.1, allowing the resulting gel solution to settle, removing and discarding the supernatant, rendering the remaining gel fluid by adding sterile physiological saline and stabilizing the resulting antigen by adding sterile solutions of benzethonium chloride and formaldehyde.

2. A method in accordance with claim 1 wherein the chemically defined medium includes phosphate salts, ferrous sulfate, pyridoxal hydrochloride, leucine, isoleucine, proline, phenylalanine, methionine and histidine.

3. A method in accordance with claim 1 wherein the *Bacillus anthracis* strain is selected by irradiating wild parent strains, plating on agar and selecting resulting colonies which are rough, nonencapsulated, avirulent and non-proteolytic and inoculating the chemically defined medium with said selected strains.

References Cited by the Examiner

UNITED STATES PATENTS

| | | | |
|---|---|---|---|
| 2,125,533 | 8/38 | Winegarden | 167—78 |
| 2,151,364 | 3/39 | Winegarden | 167—78 |
| 2,705,214 | 3/55 | Hink | 167—78 |
| 2,793,160 | 5/57 | McLean | 167—78 |
| 3,019,168 | 1/62 | Taylor | 167—78 |
| 3,097,140 | 7/63 | Schuchardt | 167—78 |

OTHER REFERENCES

Hansen: "Preparation of Aluminum, Hydroxide Gel," WHO Techn. Rep. Ser. 61, pages 64–65, 1953.

Harris-Smith et al.: J. Gen. Microbial, vol. 19, pages 91–103 (1954).

Kabat et al.: Experimental Immunochemistry, 2nd ed., May 1961, pages 871–872, pub. by Charles C. Thomas Pub.

Pharmacopeia of the United States, 16th revision, U.S.P. XVI, pages 32–33, "Aluminum Hydroxide Gel, U.S.O.P., XVI, 1960," pages 85–86, "Benzethonium Chloride Solution, U.S.P., XVI, 1960," page 303, "Formaldehyde Solution, U.S.P., XVI, 1960," published 1960 by the United States Pharmacopeial Convention, Washington, D.C.

Puziss et al.: J. of Bact., vol. 68, 1954, pages 474–482.

Puziss et al.: J. Bact., 1959, pages 137–145.

LEWIS GOTTS, *Primary Examiner.*

MORRIS O. WOLK, FRANK CACCIAPAGLIA, JR., *Examiners.*